US012097629B2

(12) United States Patent
Brette et al.

(10) Patent No.: US 12,097,629 B2
(45) **Date of Patent: *Sep. 24, 2024**

(54) RAZOR CARTRIDGE

(71) Applicants: Bic Violex Single Member S.A., Anoixi (GR); Société BIC, Clichy (FR)

(72) Inventors: Thomas Brette, Clichy (FR); Alexander Nicholas Bourque, Clichy (FR); Nikolaos Chrysanthakopoulos, Anoixi (GR)

(73) Assignees: BIC Violex Single Member S.A., Anoixi (GR); SOCIÉTÉ BIC, Clichy (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/754,768

(22) PCT Filed: Oct. 30, 2020

(86) PCT No.: PCT/EP2020/080512

§ 371 (c)(1),
(2) Date: Apr. 12, 2022

(87) PCT Pub. No.: WO2021/084069

PCT Pub. Date: May 6, 2021

(65) Prior Publication Data

US 2024/0009874 A1 Jan. 11, 2024

(30) Foreign Application Priority Data

Oct. 31, 2019 (EP) .................................... 19206591

(51) Int. Cl.

*B26B 21/22* (2006.01)
*B26B 21/40* (2006.01)
*B26B 21/56* (2006.01)

(52) U.S. Cl.

CPC ........ *B26B 21/4012* (2013.01); *B26B 21/227* (2013.01); *B26B 21/4087* (2013.01); *B26B 21/565* (2013.01)

(58) Field of Classification Search

None

See application file for complete search history.

(56) References Cited

U.S. PATENT DOCUMENTS 5,603,161 A 2/1997 Welsh
6,295,733 B1 10/2001 Wexler et al.

(Continued)

FOREIGN PATENT DOCUMENTS

EP 2365896 B1 8/2016
EP 3357653 A1 8/2018

(Continued)

OTHER PUBLICATIONS

International Search Report and Written Opinion issued in International Application PCT/EP2020/080512, mailed on Jan. 12, 2021 (8 pages).

*Primary Examiner* — Hwei-Siu C Payer

(74) *Attorney, Agent, or Firm* — Bookoff McAndrews, PLLC

(57) ABSTRACT

A cartridge for a razor comprises a plurality of blade supports, wherein at least one blade support further comprises a blade attached to an inner surface of the at least one blade support that faces away from a shaving surface, wherein the at least one blade support comprises a first optical feature disposed on a portion of an outer surface of the at least one blade support that faces towards the shaving surface, and wherein the first optical feature is a first thermochromic portion configured to change colour based (Continued)

on a temperature of the at least one blade support according to a first temperature response of the first thermochromic portion.

17 Claims, 9 Drawing Sheets

(56) References Cited

U.S. PATENT DOCUMENTS

| | | | | |
|---|---|---|---|---|
| 11,919,183 | B2 * | 3/2024 | Schizas | B26B 21/4012 |
| 2002/0000041 | A1 | 1/2002 | Doroodian-Shoja | |
| 2003/0088984 | A1 * | 5/2003 | Brandt | B26B 21/40<br>30/34.05 |
| 2005/0268470 | A1 | 12/2005 | Skrobis et al. | |
| 2007/0084058 | A1 * | 4/2007 | Szczepanowski | B26B 21/48<br>30/34.05 |
| 2011/0126413 | A1 | 6/2011 | Szczepanowski et al. | |
| 2014/0360021 | A1 * | 12/2014 | Sonnenberg | C09D 5/00<br>427/236 |
| 2018/0142141 | A1 * | 5/2018 | Xiao | B26B 21/4012 |
| 2018/0264669 | A1 | 9/2018 | Howell | |
| 2022/0009114 | A1 * | 1/2022 | Schizas | B26B 21/4087 |
| 2024/0009874 | A1 * | 1/2024 | Brette | B26B 21/4012 |

FOREIGN PATENT DOCUMENTS

| | | | | |
|---|---|---|---|---|
| EP | 4067025 | A1 * | 10/2022 | B26B 21/222 |
| WO | WO-2010017253 | A1 * | 2/2010 | B26B 21/48 |
| WO | 2012158141 | A1 | 11/2012 | |

* cited by examiner

RAZOR CARTRIDGE

CROSS REFERENCE TO RELATED APPLICATION(S)

This application is a National Stage Application of International Application No. PCT/EP2020/080512, filed on Oct. 30, 2020, now published as WO2021084069, and which claims priority to European Patent Application No. EP19206591.0, filed on Oct. 31, 2019, which is incorporated herein by reference in its entirety.

TECHNICAL FIELD

The embodiments described in the following disclosure relate to a razor cartridge, a method for manufacturing a razor cartridge, a shaving razor assembly and an associated kit of parts.

BACKGROUND

Razor cartridges (also known as safety razor cartridges or shaver cartridges) are permanently or removably attached to a razor handle that, in, is oriented in the shaving direction. Razor cartridges typically comprise one or more cutting members, each supporting a blade, mounted perpendicular to the shaving direction. Razor cartridges are also typically provided with a guard (at a leading longitudinal side of the razor cartridge in the shaving direction) and a cap (at a trailing longitudinal side of the razor cartridge in the shaving direction). In use, a user holds the razor handle in the shaving direction and brings the razor cartridge into contact with a portion of skin defining a shaving surface.

Typically, a shaving plane is defined by a tangential line intersecting the first and second skin contact points of, for example, cutting edges of the shaving head. More simply, the shaving plane may be approximated as a plane intersecting a plurality of lines between the highest points on the skin-contacting surface of a razor cartridge—for example, the flat plane between the top of a guard and the top of a cap of the shaving head. Movement of the razor handle causes the blades of the razor cartridge to be moved across a shaving surface (skin) of a user in the shaving direction, such that the shaving plane is translated across the shaving surface in the shaving direction, enabling the blades to remove unwanted hair. The temperature of the water used to rinse the razor cartridge can affect the comfort of the user and the shaving performance.

Accordingly, the performance of razor cartridges may be further improved.

SUMMARY

According to a first aspect, a cartridge for a razor is provided. The cartridge comprises:

- a plurality of blade supports, wherein at least one blade support further comprises a blade attached to an inner surface of the at least one blade support that faces away from a shaving surface. The at least one blade support comprises a first optical feature disposed on a portion of an outer surface of the at least one blade support that faces towards the shaving surface. The first optical feature is a first thermochromic portion configured to change colour based on a temperature of the at least one blade support according to a first temperature response of the first thermochromic portion.

An effect is that the inclusion of a thermochromic portion on the blade support enables the blade support to act as a directly visible indicator having direct thermal contact to the thermochromic portion and the razor blade. Because the thermochromic portion is in direct thermal contact with the razor blade, the thermochromic portion reports the temperature of the razor blade, or a temperature transition point of the razor blade, more accurately and/or with less time latency.

According to an embodiment, the plurality of blade supports comprises a second blade support, wherein the second blade support comprises a second optical feature disposed on a portion of an outer surface of the second blade support that, in use, faces towards the shaving surface. The second optical feature is a second thermochromic portion configured to change colour based on the temperature of the second blade support according to a second temperature response of the second thermochromic portion.

An effect is that the razor cartridge may contain more than one thermochromic portion (thermochromic ink) that each change colour at different temperatures.

According to an embodiment, at least one blade support further comprises a further optical feature disposed on a different portion of an outer surface of the at least one blade support that faces towards a shaving surface than the portion of the at least one blade support comprising the first thermochromic portion. The further optical feature is a further thermochromic portion configured to change colour based on the temperature of the at least one blade support according to a further temperature response of the further thermochromic portion.

According to an embodiment, the first temperature response of the first thermochromic portion is different to the second temperature response of the second thermochromic portion and/or different to the further temperature response of the further thermochromic portion.

An effect is that the razor cartridge may provide feedback to the user concerning a plurality or range of water temperatures.

According to an embodiment, the first thermochromic portion is configured to display a first colour when the at least one blade support has a first temperature and to display a second colour when the at least one blade support has a second temperature.

An effect is that the razor cartridge may provide feedback to the user based on different colours concerning a plurality or range of water temperatures used to rinse the razor blade, and/or the temperature of the razor blade itself.

According to an embodiment, the first thermochromic portion is configured to change colour when the temperature of a portion of the at least one blade support is in the range 20-45 degrees Celsius, more specifically 32-42 degrees Celsius, and most specifically 35-39 degrees Celsius.

An effect is that a razor according to the first aspect can be configured to change colour when rinse water passing through a razor cartridge reaches a temperature that users prefer for pleasant wet shaving.

According to an embodiment, the first thermochromic portion extends longitudinally along the at least one blade support, and wherein the first thermochromic portion is divided longitudinally into at least a first and a second sub-portion, wherein the first sub-portion is configured to display a different colour from the second sub-portion based on the temperature of the at least one blade support.

An effect is that a temperature of the razor blades of a razor cartridge can be more intuitively tracked across a range of temperatures using a range of colours.

According to an embodiment, the first thermochromic portion comprises a thermochromic ink compound comprising one or more of: a leuco dye, a developer, and a first reaction medium.

An effect is that the colour transition temperature may be accurately and effectively directed towards temperatures of interest.

According to an embodiment, the second thermochromic portion comprises a thermochromic ink compound comprising one or more of: a leuco dye, a developer, and a second reaction medium, and wherein the second reaction medium has a melting point that is higher or lower than the melting point of the first reaction medium.

According to an embodiment, the first reaction medium is selected from the group comprising ethyl palmitate, dimethyl sebacate, methyl palmitate, methyl p-toluate, ethyl stearate, methyl 3,4-dimethylbenzoate, dimethyl itaconate, methyl stearate, methyl eicosanoate, 2-tridecanol, 1-dodecanol, 4-isopropylbenzyl alcohol, 2-(4-methoxyphenyl) ethanol, 1,2-octanediol, 1-tetradecanol, 2,2-di-n-butyl-1,3-propanediol, 1-pentadecanol, undecanoic acid, erucic acid, decanoic acid, dodecanoic acid, N-octadecane, N-nonadecane, N-eicosane, N-heneicosane, N-docosane, 2-tridecanone, 7-pentadecanone, 5-hexadec anone, 7-hexadecanone, 2-pentadecanone, 4-heptadecanone, 3,4-dimethylbenzophenone, octadecyl 3,3-diphenylpropanoate, 2-Phenylethyl phenylacetate.

Specifically, the first reaction medium is selected from the group comprising methyl palmitate, 1,2-octanediol, decanoic acid, n-octadecane, 7-pentadecanone, dimethyl sebacate, 1-dodecanol, 4-isopropylbenzyl alcohol, n-octadecane, ethyl stearate, octadecyl 3,3-diphenylpropanoate, stearyl benzoate, dodecanophenone.

In an embodiment, the reaction medium is a wax or wax derivative.

According to an embodiment, the first optical feature includes a first layer and a second layer disposed on the first layer, wherein the first layer includes a first colour, the second layer includes a second colour, and the second layer is configured to be gradually removed during use of the razor.

An effect is that visual feedback can be provided to a user indicating how frequently a blade has been used, because the erosion of the second layer including a second colour is proportional to the degree of use of the razor cartridge.

According to an embodiment, the blade support includes a first portion, a second portion, and a third portion, wherein the third portion is visible through a rear frame of the cartridge, and the first optical feature is provided on one or more of the first portion, the second portion, or the third portion.

An effect is that visual feedback of the temperature of blades of the razor cartridge can be provided either from the front of the razor cartridge (the portion of the razor cartridge that conventionally touches the shaving surface), and/or visual feedback about the temperature of the blades can be provided to a user looking through the open-backed frame of a razor cartridge when rinsing the razor cartridge, for example.

According to an embodiment, the first thermochromic portion is configured to perform an irreversible colour change as the first temperature response.

An effect is that the razor cartridge can visually report to a user that the razor cartridge has, at some time, been used at least once (if the thermochromic portion is chosen to comprise a dye with a relatively low activation temperature, for example). Alternatively, the razor cartridge can visually report to a user that the razor cartridge has, at some time, been exposed to water that is too hot.

According to an embodiment, the first optical feature is a coating applied to the at least one blade support comprising the thermochromic portion.

According to a second aspect, there is provided a method of manufacturing a cartridge for a razor according to any of the preceding claims comprising:

obtaining a plurality of blade supports, wherein at least one blade support further comprises a blade attached to an inner surface of the blade support that faces away from the shaving surface (SH), wherein the at least one blade support comprises a first optical feature disposed on a portion of an outer surface of the at least one blade support that faces towards a shaving surface (SH), and providing the first optical feature on the at least one blade support comprising a first thermochromic portion configured to change colour based on the temperature of the at least one blade support according to a first temperature response of the first thermochromic portion.

According to a third aspect, there is provided a shaving razor assembly comprising a razor cartridge according to the first aspect or its embodiments. The razor cartridge is either releasably attached to the razor handle via a pivotable or non-pivotable connection, integrally formed with the razor handle via a non-pivotable connection, or integrally formed with the razor handle via a pivotable connection.

According to a fourth aspect, there is provided a kit of parts comprising a razor cartridge holder comprising a plurality of razor cartridges according to the first aspect or its embodiments, and optionally a razor handle.

Further embodiments are presented in the following detailed description and drawings, to which the reader should now refer.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting embodiments. Common reference numerals on different figures indicate like or similar features.

DETAILED DESCRIPTION

Figure 1:
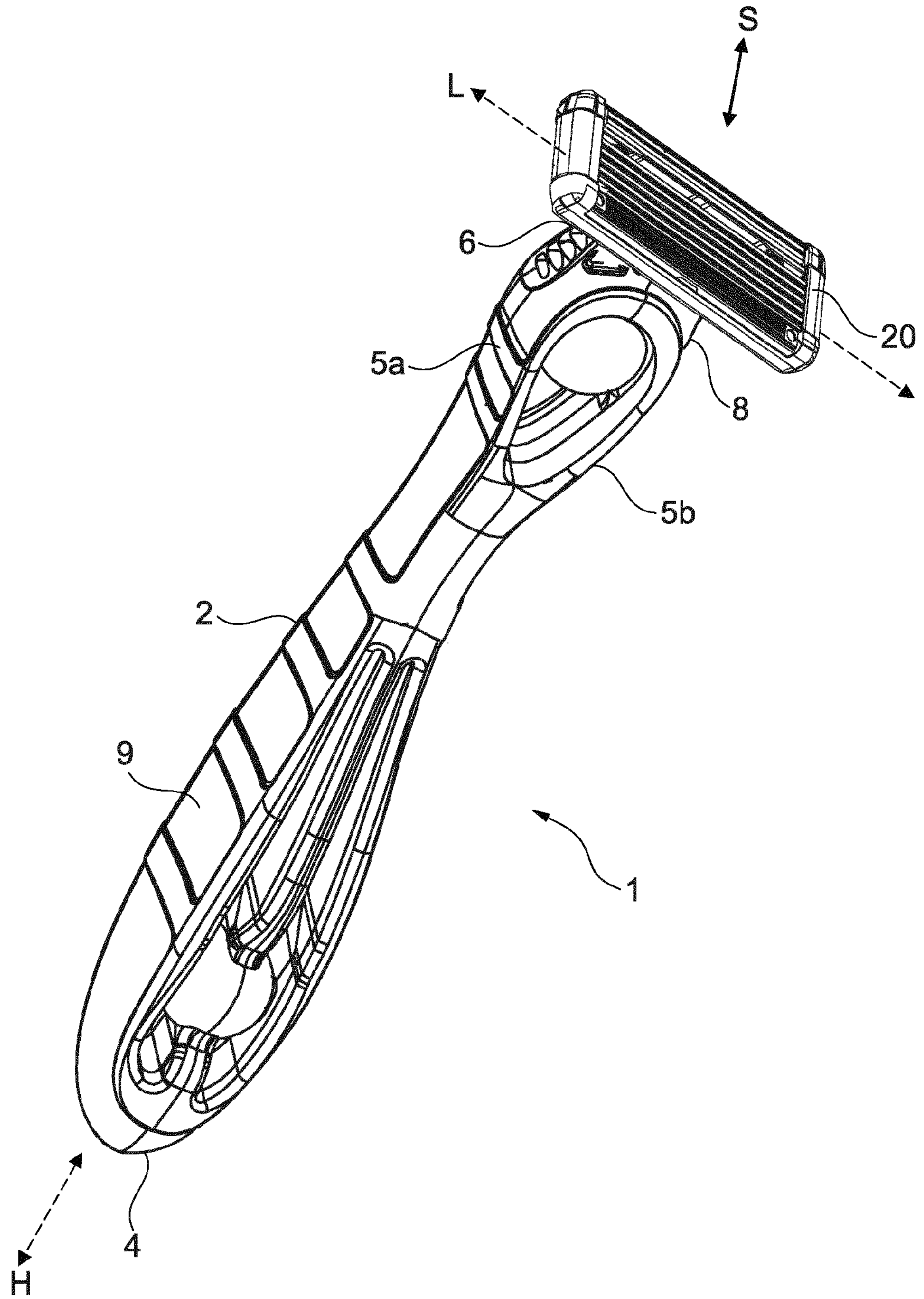
FIG. 1 is a perspective view of a shaving razor assembly according to an embodiment.

FIG. 1 is a perspective view of a shaving razor assembly 1 according to an embodiment. The shaving razor assembly comprises blades which are not driven by a motor. The shaving razor assembly 1 comprises a handle 2 extending in a handle direction H between a proximal portion 4 and a distal portion 6 of the handle 2. A razor cartridge 20 is mounted at the distal portion 6 of the handle 2. The razor cartridge 20 will be presented in more detail following discussion of the shaving razor assembly 1.

The mounting of the razor cartridge 20 to the distal portion 6 of the handle 2 in the illustration is via a pivotable bearing member 8 enabling a frame of reference of the handle 2 to vary relative to a frame of reference of the razor cartridge 20, to thus enable the angle of the razor cartridge against the skin of a user to vary and adapt to changes during use.

In particular, the razor cartridge 20 pivots relative to the handle 2 about the longitudinal axis L of the razor cartridge 20, in use. The pivoting enables the user to adapt to contours of the body, for example. The longitudinal axis L of the razor cartridge 20 is substantially perpendicular to the shaving direction along the handle 2. Another embodiment of a connection mechanism for connecting the razor cartridge 20 to the handle 2 is discussed in WO2006/027018 A1. Another alternative is a razor cartridge 20 that may pivot relative to a second pivot axis (a rocking axis), substantially perpendicular to axis L. In embodiments, the pivotable bearing member 8 may be omitted (not illustrated) and the handle 2 provided as an integrally connected part of the support of the razor cartridge 20. In an embodiment, the pivotable bearing member 8 may further comprise, or be replaced by, a release mechanism 5*a*, 5*b*, enabling rapid release of an exhausted razor cartridge from the handle 2.

In an embodiment, the handle 2 and the support of the razor cartridge 20 are integrally formed with a pivotable bearing member (not illustrated) such as a plastic spring member.

The connection of the razor cartridge to the handle is not limited only to the aforementioned embodiment that entails the razor cartridge to be releasably attached to a razor handle via pivotable connection. In embodiments, the razor cartridge is releasably attached to the razor handle via a non-pivotable connection. In embodiments, the razor cartridge is monolithically formed with the razor handle, i.e. the razor cartridge is integrally formed with the razor handle via a non-pivotable connection. In embodiments, the razor cartridge is integrally formed with the razor handle via a pivotable connection.

In an embodiment, the handle 2 is provided with a handle grip 9 formed of a rubber, or rubber-like material to improve gripping friction. In an embodiment, the handle is provided with a thumb-rest 7 to enable a more secure grip of the handle 2 by a user.

The phrase "top of the blade support" for the purposes of this specification means a side of a blade support of a razor cartridge that is closest to a shaving surface of a user when the razor cartridge is in use. When a razor cartridge with such top-mounted cutting members is used, aggressive shaving may result in an increased degree of nicks and cuts and an increased sense of irritation, because the shaving surface is exclusively supported by the cutting edges 30 of the blades on the blade support. This provides the skin with a relatively small surface to be supported on during shaving, and causes an increased degree of "bulging" of the shaving surface (skin) between the inter-blade gaps.

It is difficult to gauge a comfortable water temperature used for shaving using conventional razor cartridges.

According to a first aspect, a cartridge 20 for a razor is provided. The cartridge comprises a plurality of blade supports 32, wherein at least one blade support further comprises a blade 33 attached to an inner surface 66 of the at least one blade support 32 that faces away from a shaving surface. The at least one blade support 32 comprises a first optical feature disposed on a portion of an outer surface of the at least one blade support that faces towards the shaving surface. The first optical feature is a first thermochromic portion 74 configured to change colour based on a temperature of the at least one blade support according to a first temperature response of the first thermochromic portion.

Figure 2:
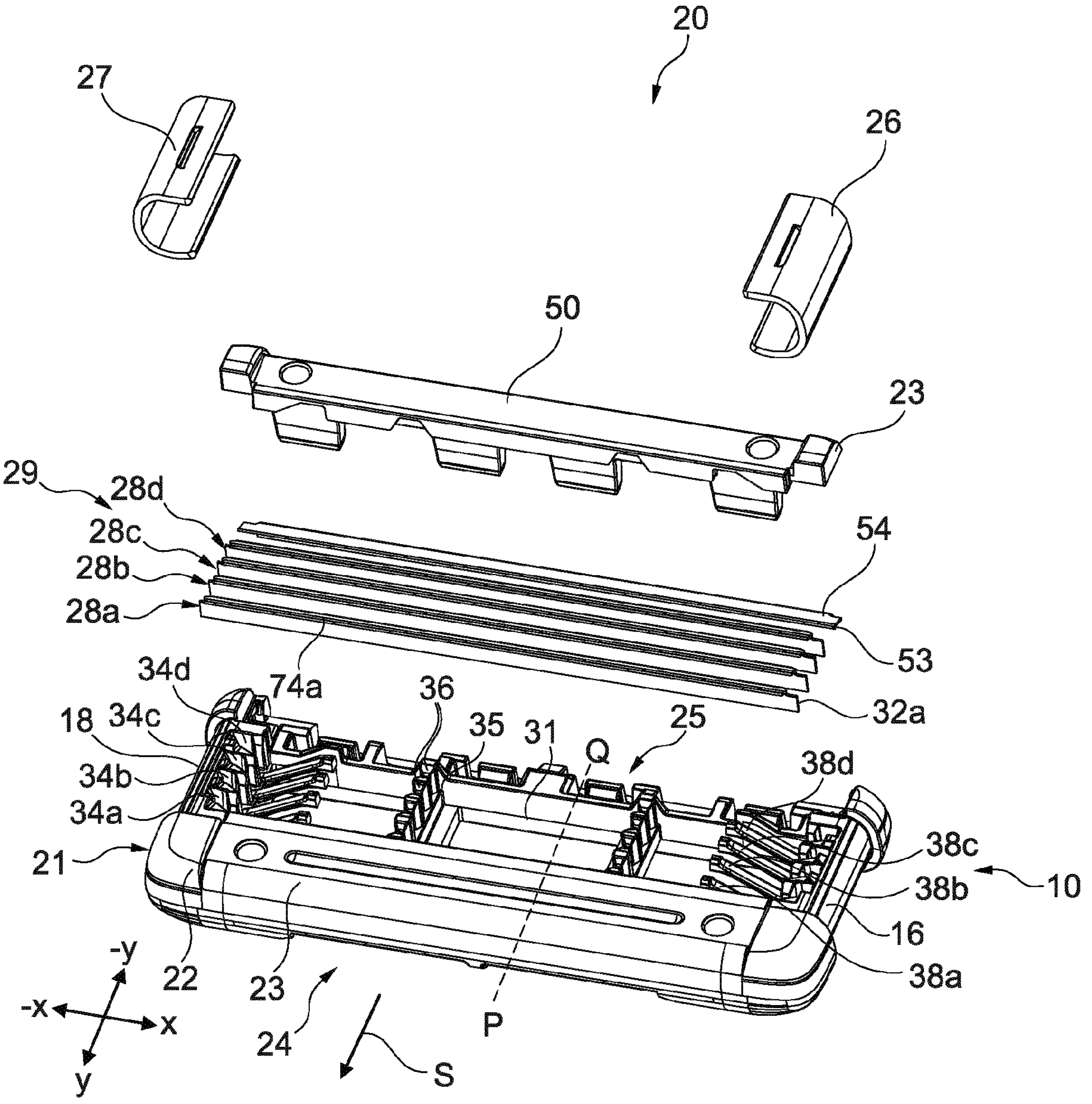
FIG. 2 shows a perspective partial exploded view of a razor cartridge assembly according to an embodiment.

FIG. 2 shows a perspective partial exploded view of a razor cartridge assembly according to an embodiment. "Partial exploded view" means that some minor components of the razor cartridge 20 have been omitted from the exploded view to aid clarity of the drawing.

Figure 3:
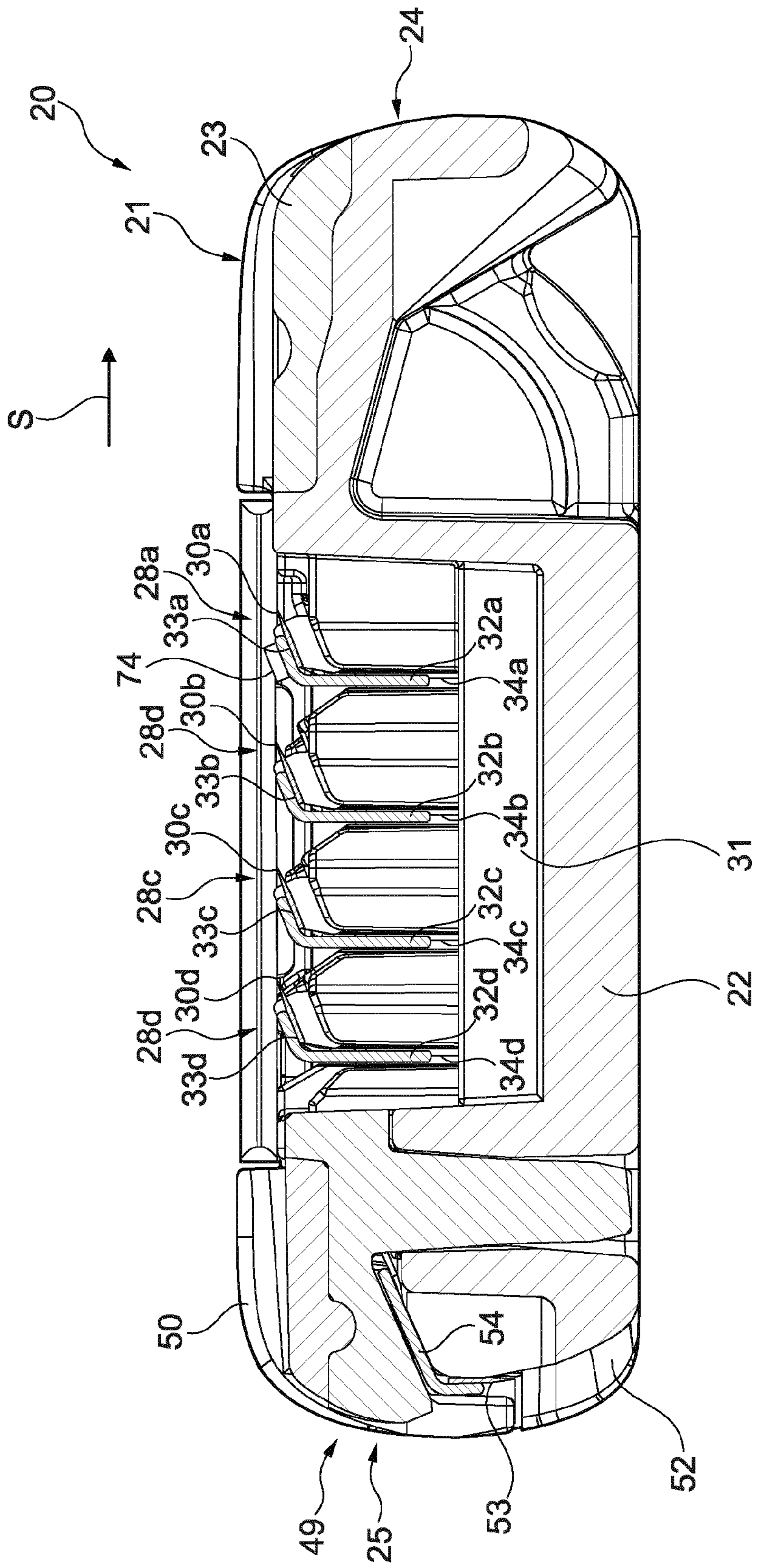
FIG. 3 shows a schematic side view of a portion of a razor cartridge assembly according to an embodiment.

The shaving direction S is depicted in FIGS. 2 and 3 using arrow S. In use, the razor cartridge 20 contacts a shaving surface (not shown in FIG. 2), and is translated across the shaving surface in the direction of arrow S.

A frame 21 may be fabricated partially or completely of synthetic materials, such as plastic, resin, or elastomers. The frame 21 comprises a platform member 22 connectable to a handle 2 of a shaving razor assembly 1 either integrally, or by a connection mechanism such as a pivotable bearing member 8 or by an interconnecting member (not shown).

A guard member 23 is provided as a substantially longitudinal edge of the razor cartridge 20. In use, the guard member 23 is located at a leading longitudinal side 24 is the first portion of the razor cartridge 20, and is thus the first portion of the razor cartridge 20 to contact uncut hairs. The side of the razor cartridge 20 opposite to the leading longitudinal side of the razor cartridge 20 and opposite to the shaving direction is the trailing longitudinal side 25 of the razor cartridge 20. The trailing longitudinal side 25 is thus the final portion of the razor cartridge 20 to contact the shaving surface, in use.

It will be noted that the terms "leading longitudinal side 24" and "trailing longitudinal side 25" are used to denote specific locations on the razor cartridge 20, and do not imply or require the absence or presence of a particular feature. For example, a guard member 23 may in one embodiment be located at the "leading longitudinal side 24", and in another embodiment a trimming blade may be located at the "trailing longitudinal side 25" in another embodiment, but it is not essential that these locations comprise such features.

Figure 4:
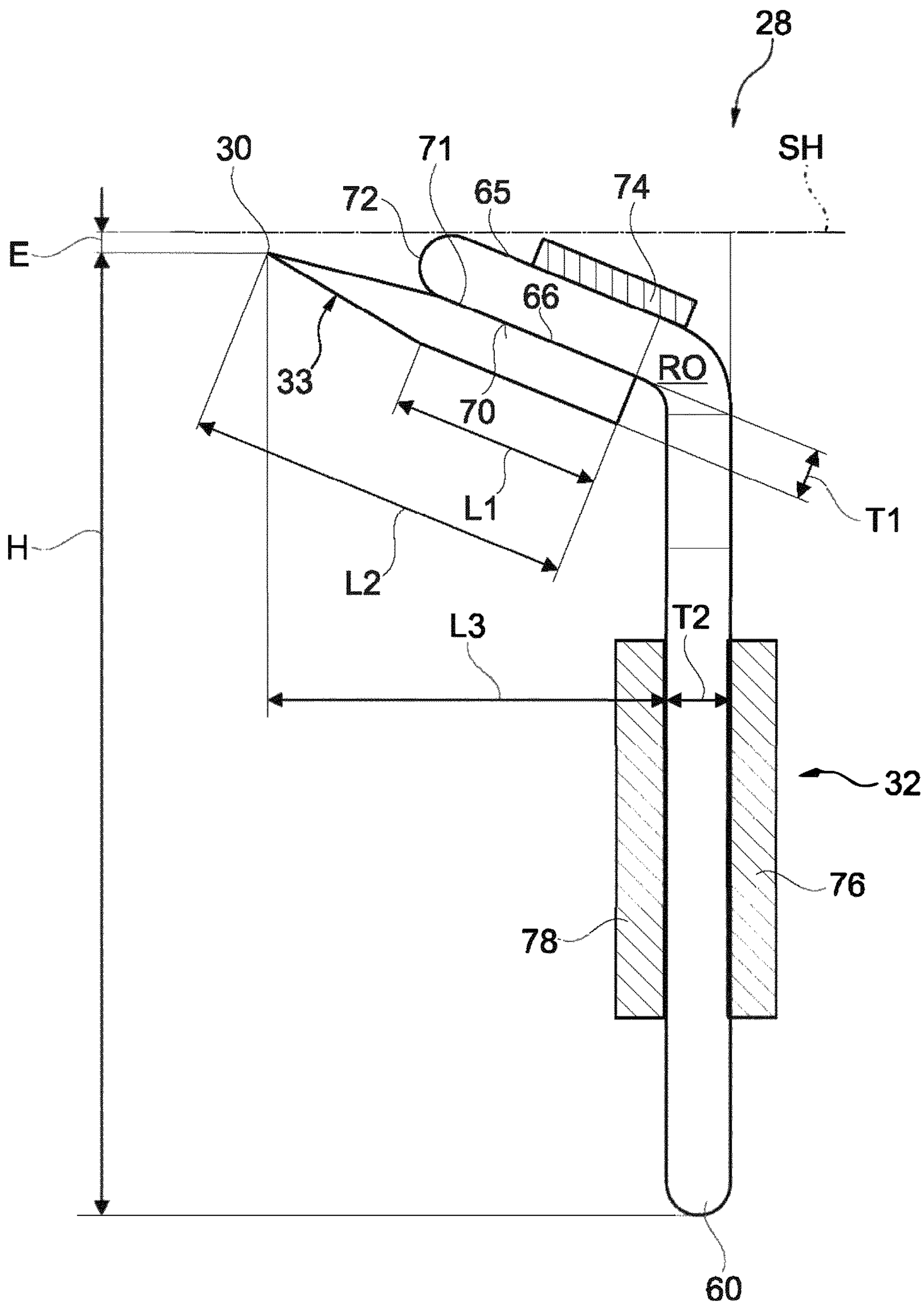
FIG. 4 shows a schematic side view of a cutting member.

The guard member 23, in an embodiment, comprises an elastomeric member (not shown in FIG. 4). In an embodiment, the elastomeric member comprises one or more fins extending longitudinally in parallel to the guard member 23 and substantially perpendicularly to the shaving direction. One purpose of such an elastomeric member is, for example, to tension the skin prior to cutting.

The razor cartridge 20 may, in embodiments, further comprise a cap member (longitudinal trailing assembly 49) at, or near to, the trailing longitudinal side 25. The presence of a cap member (longitudinal trailing assembly 49) is not essential.

The razor cartridge 20 further comprises a group of cutting members 29 accommodated in a blade receiving section 31 of the frame 21. The group of cutting members 29 comprises a plurality of cutting members 28*a-d*. The group of cutting members 29 is disposed in the frame 21 longitudinally and parallel to the shaving direction SH such that in use, blades of the cutting members 28*a-d* contact a shaving surface and cut hair present on the shaving surface as the razor cartridge 20 is moved across the shaving surface in the shaving direction S. The particular design of the group cutting members 29 will be discussed in detail subsequently.

In particular, at least one blade support 32*a* comprises a first optical feature as a thermochromic portion 74*a*. The precise disposition of the thermochromic portion 74*a* on the blade support 32*a* will be discussed in detail subsequently. Because the thermochromic portion 74*a* is in direct thermal contact with the metal of the blade support 32*a*, and because the blade support 32*a* is in direct thermal contact with the metal of the blade 33, the arrangement discussed herein provides accurate and rapid visual feedback about the temperature of a blade 33 to a user of the razor cartridge 20.

In an embodiment, a razor cartridge is provided with three cutting members. In an embodiment, a razor cartridge 20 is provided with four cutting members 28. In an embodiment, a razor cartridge 20 is provided with five cutting members 28. In an embodiment, a razor cartridge 20 is provided with six cutting members 28. In an embodiment, a razor cartridge 20 is provided with seven or more cutting members 28. It is not essential that all or a plurality of blade supports 32 of the cutting members 28 are provided with a thermochromic portion 74.

The group of cutting members 29 defines a plurality of substantially parallel inter-blade spans. The number of inter-blade spans is one fewer than the number of cutting members.

The frame 21 further comprises first retainer 26 and second retainer 27 configured to hold the razor blades within razor cartridge 20 housing. The frame 21 further comprises first 16 and second 18 side portions. When the razor cartridge 20 is in an assembled state, the first and second side portions 16, 18 are configured to fixedly confine the longitudinal ends of the guard member 23, and the group of cutting members 29. The first side retainer 26 and second retainer 27 may comprise, for example, plastic, an elastomer, or a metal material and furthermore may be of a different shape to that illustrated.

Although not illustrated, a pivotable bearing member 8 may, in an embodiment, be provided on the side of the razor cartridge 20 configured to connect to a pivotable handle 2. Such a pivotable bearing member 8, in an embodiment, comprises two or more shell bearings configured to connect to the pivotable bearing member 8 of the handle 2, although many other designs for a pivotable bearing may be employed.

The cutting members comprised in the group of cutting members 29 are disposed in the razor cartridge such that two cutting edges 30 comprised, respectively, on the two foremost (nearest to the leading side of the razor cartridge) cutting members of the group of cutting members 29 define a leading inter-blade span that is closest to the leading longitudinal side 24 of the razor cartridge 20. The inter-blade spans may be constant, or vary between blades.

The each cutting member in the group of cutting members 29 comprises a longitudinal blade support 32. A longitudinal blade is mounted on the blade support 32. The cutting edge 30 of a cutting member 28*a-d* is oriented forward in the direction of shaving S. The blade support 32 of a cutting member 28*a-d* is an elongated, bent piece of rigid material. In an embodiment, the blade support 32 is a metal such as stainless steel.

Each cutting member in the group of cutting members 29 is, in an embodiment, resiliently mounted in a blade receiving section 31 of the razor cartridge 20. The blade receiving section 31 comprises a longitudinal space in the razor cartridge 20 that is sized to accommodate the group of cutting members 29. At least one cutting member of the group of cutting members 29, up to all cutting members in the group of cutting members 29 may be resiliently mounted in the blade receiving section 31. In the embodiment of FIG. 2, the transverse inner sides of frame 21 comprise a plurality of holding slots 34. Each holding slot 34 on the transverse inner sides is configured to accept and retain one side of a blade support 32 of a cutting member of the group of cutting members 29 so that the cutting members of the group of cutting members 29 are held in the blade receiving section 31 with a substantially parallel inter-blade span. Therefore, as many holding slots 34 are provided in each transverse inner side of frame 21 as there are blade support members.

Between the blade receiving section 31 and the handle (in a part adjacent to a handle 2 connection, for example) there are, in embodiments, provided one or more cross members 35 that are integrally formed with the frame 21. The cross members 35 may comprise a plurality of blade support guides 36 provided as a plurality of protuberances aligned with the holding slot 34 on the transverse inner sides of the frame 21. The blade support guides 36 function to regulate the parallel inter-blade span in a longitudinal direction.

In one variant (illustrated in FIGS. 2 and 3), the spacing of the blade supports 32 is progressively decreased between the leading longitudinal side 24 and the trailing longitudinal side 25 of the razor 20 to generate a variable inter-blade span IBS. One alternative way to achieve this arrangement is to progressively decrease the spacing between the holding slots 34 provided on the transverse inner sides in a transverse direction (y to −y) of the razor cartridge. The positioning and/or width of the blade support guides 36 is adjusted commensurately such that the group of inter blade spaces IBS between cutting edges 30 of the cutting members 28*a-d* is parallel. Alternatively, the spacing between consecutive blades may be equal in the P-Q direction.

The razor cartridge 20 of FIG. 4 as comprises four resilient fingers 38*a*, 38*b*, 38*c*, 38*d* under the first retainer 26. The razor cartridge 20 comprises four resilient fingers under the second retainer 27 that are in transverse corresponding alignment with the four resilient fingers 38*a*, 38*b*, 38*c*, 38*d* under the first retainer 26.

In total, the eight resilient fingers each exert a bias force against respective cutting members of the group of cutting members 29 in the direction of the shaving surface such that the cutting members of the group of cutting members 29 are in a rest position, when assembled. In the rest position, the cutting edges 30 of the blades 33, at each lateral end of the blades 33 near the first 26 and second 27 retainers, bear against corresponding stop portions, for example. In an embodiment, the stop portions may be the first 26 and second 27 retainer.

Accordingly, the rest position of the cutting members 28*a-d* is well defined, enabling a high shaving precision. Of course, the illustrated biasing arrangement has many variations. For example, a further plurality of resilient fingers may be provided on one or more of the cross members 35. In a simplified razor cartridge design (such as for low cost, disposable razors), the resilient fingers may be omitted. A skilled person will appreciate that the number of resilient fingers 38 to be provided is related to the number of cutting members 28*a-d* in the group of cutting members 29, and that fewer or more than eight resilient fingers 38 can be provided.

FIG. 3 shows a schematic side view of a portion of the razor cartridge assembly of FIG. 2 along a transverse axis P-Q illustrated by the dotted line in FIG. 2. Where possible, like elements are denoted with like reference numerals.

In addition to the features illustrated in partial exploded view FIG. 2, FIG. 3 further illustrates a longitudinal trailing assembly 49 (cap member) that may, in some embodiments, be included as part of a razor cartridge 20 but is not essential.

In particular, the optional longitudinal trailing assembly 49, in embodiments, comprises an optional longitudinal skin care element 50 (e.g. a lubricating strip) for applying a compound, such as a lubricating compound, to the shaving surface after the cutting edges 30 of the blades have passed over the shaving surface.

The optional longitudinal trailing assembly 49, in embodiments, comprises a longitudinal trimming blade 53 disposed on the trailing longitudinal side 25 of the razor cartridge 20. The trimming blade 53 may, for example, be used for trimming hairs that are awkward to reach using the blades 33 of the group of cutting members 29, such as extraneous nasal hairs. In an embodiment, the trimming blade 53 only extends across a proportion of the longitudinal direction of the longitudinal trailing assembly 49, such as up to three quarters, up to one half, or up to one quarter.

As illustrated, the trimming blade 53 is mounted on a trimming blade support 54. The assembly of the trimming blade 53 mounted on a trimming blade support 54 is, in an embodiment, identical to the design of the blade receiving section 31, blade support 32, and blade 33 comprised in the group of cutting members 29 to reduce parts variation. Alternatively, the trimming blade 53 and trimming blade support 54 are produced to a different design to the design of the blade receiving section 31, blade support 32, and blade 33 comprised in the group of cutting members 29.

In an embodiment, the optional longitudinal trailing assembly 49 comprises a retractable cover 52 as a safety feature, and to keep the trimming blade 53 sharp when not in use.

In common with the frame 21 of the razor, the optional longitudinal trailing assembly 49 and/or the retractable cover 52 may be provided as a plastic or resin material. In an embodiment the longitudinal trailing assembly 49 is formed integrally with the frame 21. In an embodiment, the longitudinal trailing assembly 49 is glued or ultrasonically welded to the frame 21, for example. In an embodiment, a razor cartridge 21 is provided without a longitudinal trailing assembly 49 such that the trailing edge of the frame 21 in the shaving direction is the trailing longitudinal side 25 of the razor cartridge 20. In an embodiment where the razor cartridge 20 comprises the longitudinal trailing assembly 49, the trailing longitudinal side 25 of the longitudinal trailing assembly 49 in the shaving direction is considered to be the trailing edge of the frame 21 in the shaving direction.

FIG. 4 shows a schematic side view of a cutting member 28 comprising a thermochromic portion.

A blade mounting portion 71 is disposed on an inner surface 66 of a respective blade support 32 that, in use, faces away from a shaving surface. The cutting edge 30 extends forward from the front of the blade support 32.

The opposite side of the blade support 32 comprises an outer surface that, in use, faces towards the shaving surface, or skin of the user. Alternatively, this is referred to as a top side of the blade support 32. A first optical feature is provided on the top side of the blade support as a first thermochromic portion 74. As will subsequently be discussed, the first thermochromic portion 74 may be disposed in many different ways on the top side of the blade support 32.

Therefore, in use the first thermochromic portion 74 is visible when a user observes the front of the razor cartridge 20. Alternatively, or in combination, the optical feature may be provided on a second portion 76 of the blade support 32. Alternatively, or in combination, the optical feature may be provided on a third portion 78 of the blade support 32. Alternatively, or in combination, the optical feature may be provided on the surface of the front end 72 and the optical feature can be sufficiently visible by the user, especially when the blade support 32 is thick. When the optical feature is provided as a second thermochromic portion 76 or the third thermochromic portion 78 of the blade support 32, the optical feature is not visible from the front of the razor cartridge 20. However, many razor cartridges have an open frame 21 to enable water to flow more easily during rinsing. The effect of an open frame 21 is that the rear of the blade support 32 is visible when a user holds a razor cartridge 20 with the front of the razor cartridge 20 facing away from them.

Accordingly, an optical feature (thermochromic portion 74) enables feedback about the temperature of blade support members 32 of the razor cartridge 20 from the front of the razor cartridge 20. In an embodiment, as different users may rinse a razor cartridge 20 from either the front or the back, additional thermochromic portions 76 or 78 may be provided on portions of at least one blade support that are visible through the rear of an open frame 21.

The blade support 32 has a non-negligible thickness. For example, the blade support 32 has a thickness in the range 0.12 mm-0.21 mm, and more specifically in the range 0.155 mm-0.185, specifically in the range 0.155 mm-0.17 mm and most specifically 0.15 mm.

In an embodiment, each blade support 32 of the group of cutting members 29 is identical and has the same thickness T2 and the same tilt angle A. In this case, the cutting edge to blade span 43*a*, 43*b*, 43*c*, and 43*d* are identical.

Although a razor cartridge with four blades 33*a-d* has been illustrated, the present specification also includes a razor cartridge comprising three blades, or greater than four blades.

Accordingly, each of the blade supports 32*a-d* comprises a rounded front end 72 that is configured, in use, to contact the shaving surface in addition to the cutting edges 30 of the blades, thereby reducing the pressure at each cutting edge contact point with the shaving surface. The pressure at the cutting edge contact points may therefore be reduced.

As discussed, the blade support 32 may be made from a flat sheet metal part which is bent before welding of the blade 33 on the inner surface 66 of the blade support 32. The cutting member 28 thus comprises a blade 33 (razor blade).

The blade 33 has, in its flat portion, a thickness T1 about 0.1 mm (for example, between 0.04 and 0.11 mm, specifically about 0.074 mm). The total length L2 of the blade 33 between the cutting edge 30 of the blade 33 and the opposite back edge of the blade 33 is about 1 mm (for example, between 0.8 mm and 1.3 mm). The portion of the blade 33 that is in contact with the inner surface 66 of a blade support that, in use, faces away from a shaving surface has a length L1 that is about 0.49 mm+/−0.1 mm long. In this way, a good retention of the blade on the underside of the blade support 32 (the inner surface of the blade support 32) is ensured.

In an embodiment, the height of the cutting member 28 H is between 2.53 mm and 2.63 mm, specifically 2.58 mm.

In an embodiment, the front end 72 of the blade support is rounded or chamfered to improve glideness properties of the cutting member.

In an embodiment, the blade 33 may be positioned on the inner surface 66 of the blade support 32 to adjust the exposure E of the cutting edge 30 positively or negatively compared to the shaving surface. The exposure is a measure of how prominently the cutting edge 30 of a blade protrudes above or sinks below the end 72 of its blade support.

In an embodiment, the blade 33 may be positioned to have an exposure relative to the shaving surface in the range −80 um to +80 um, more specifically an exposure of about −75 um, −65 um, −60 um, −55 um, −50 um, −45 um, −40 um, −35 um, −30 um, −25 um, −20 um, −15 um, −um, −5 um, 0 um, 5 um, 10 um, 15 um, 20 um, 25 um, 30 um, 35 um, 40 um, 45 um, 50 um, um, 60 um, 65 um, 70 um, or 75 um.

The length L3 of the cutting member 28, between the cutting edge 30 and the outer face of the lower portion of the blade support 32 is about 1.0 mm (for example, between 0.9 mm and 1.6 mm).

The blade 33 is fixed on the inner surface 66 of the blade support by any known means, such as by laser spot welding. Specifically, the blade 33 is fixed on the inner surface 66 of the blade support by a plurality of spot welds (for example, between ten and sixteen spot welds) distributed along the longitudinal dimension of the blade support 32. Each of the spot welds may be performed on the inner face 70 of blade 33. Alternatively, each of the spot welds may be carried out on the outer surface of the blade support 68, or a mixture of the two.

Figure 5A:
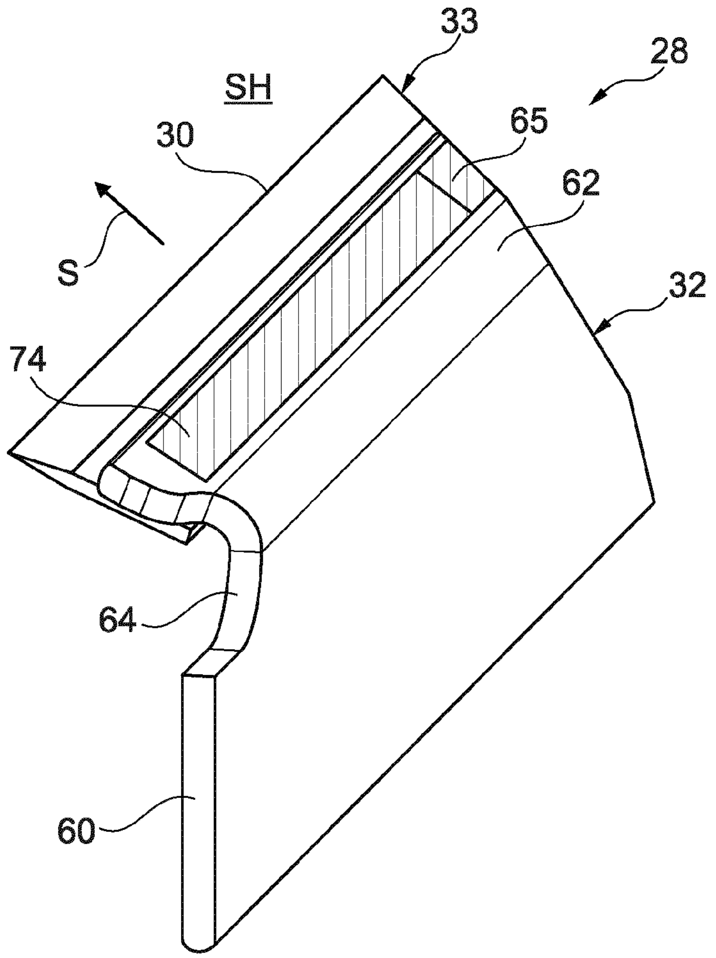
FIGS. 5*a* and 5*b* show perspective views of a portion of a cutting member according to embodiments.
Figure 5B:
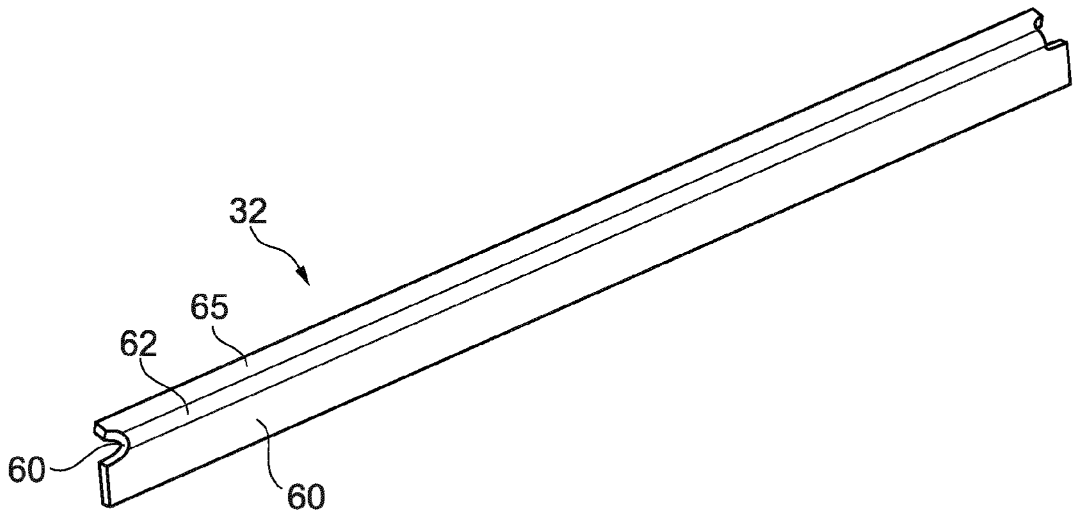

FIG. 5*a* shows a perspective view of a portion of a cutting member 32 according to an embodiment. Like features discussed in FIG. 4 share the same reference numerals. The top side 65 of blade support member provides a mounting portion for the first thermochromic portion 74. As illustrated, the first thermochromic portion 74 is a continuous strip applied to the top side 65 of the blade support member 32, or may be divided into sub-portions.

Conventionally, a blade is mounted on the outer surface of a blade support, such that in use, no part of the blade support comes into contact with shaving surface.

Notably, in the present aspects and embodiments, a blade mounting portion 71 of the blade support 32 is disposed on an inner surface of the respective blade support that, in use, faces away from a shaving surface, and a blade attached to the blade mounting portion 71 as shown in FIG. 4.

According to the present approach, the blade 33 is mounted on an inner surface of the respective blade support and projects from underneath the inner surface defining a cutting edge to blade span 43 between a cutting edge 30 of the blade and the end of the blade support 32 towards the shaving surface. In use, as the cutting member 28 contacts the shaving surface, both the cutting edge of the blade 30 and the end of the blade support 32 contact the shaving surface simultaneously, leading to a reduction in the force exerted on the shaving surface exerted by a single cutting edge, for example.

In other words, the position of a blade 33 on a blade support 32 when a cutting member 28*a-d* is mounted in the razor cartridge is defined by the fact that an imaginary tangent provided from the surface of the blade 33 that is directed away from the shaving surface (such as the skin of a user, in use)does not pass through any point of the blade support 32 that the blade 33 is mounted on.

A further definition of the position of a blade 33 on the blade support is that when a cutting member 28*a-d* is mounted in the razor cartridge, an imaginary tangent provided from the portion of the blade 33 in contact with the blade mounting portion 71 that is directed towards the shaving surface in use passes through the blade support 32 that the blade 33 is mounted on.

A further effect is that the provision of a blade 33 hanging “underneath” the blade support 32 as illustrated in particular in FIG. 4, is that the top side 65 of the blade support 32 is available for providing visual feedback to the user. In embodiments, this may be a simple printed logo or block of colour. The top side 65 of the blade support 32 (and optionally also the second 76 and third 78 portions of the blade support 32) enable the direct contact of a thermochromic portion with the metallic material of the blade support 32. Thermal energy related to an actual temperature of the blade support 32 may be conducted directly to the thermochromic portion 74 and displayed to a user, to provide the user with more accurate feedback about the temperature of the blade support 32, and hence a blade 33 mounted on the blade support 32 (assuming that conduction losses between the metal comprising the blade 33 and the blade support 32 is minimal). This approach is more accurate than, for example, providing a minimal optical feature to provide optical feedback of the temperature of a razor cartridge in, for example, the frame 21, as provided in the prior art.

In embodiments, the thermochromic portion is in direct contact with the metallic material of blade support 32, and owing to the use of a “hanging blade” arrangement, a portion of the top side 65 of the blade support 32 is wide enough to accommodate a portion or strip of a thermochromic portion 74 that can easily be seen by a user of the razor cartridge 20.

Domestic water systems frequently take up to ten seconds to reach a stable temperature, and may overshoot a desired shaving temperature. Providing a plurality of thermochromic inks responsive to different temperatures may provide an indication to the user that the temperature of the water varies during wet shaving, and may become higher than a temperature at which the user initially began shaving.

The optical feature (optical indicators) formed by the first thermochromic portion are, in embodiments, provided by a thermochromic ink incorporated on the blade support 32 of the cutting member 28. An embodiment of a thermochromic ink is a mixture of a colour-developing organic compound (compound A), a colour developer (compound B), and a colour change temperature regulator (compound C). The colour change temperature regulator acts as a reaction medium for reversible electron exchange between compound A and compound B. In some embodiments, compound C may be a wax.

In other embodiments, the optical feature (optical indicators) formed by the first thermochromic portion can be liquid crystals, such as cholesterol esters, specifically cholesterol oleate/(Z)-octadec-9-enoate, or phenyl ether derivatives of phenyl esters of 4-(2-methylbutyl)phenol.

In the present specification, an embodiment of the colour-developing organic compound is a leuco dye (compound A). Alternatively, the leuco dye may be considered to be an electron-donating compound. The colour developer (compound B) functions as an electron-accepting compound.

In embodiments, compounds A, B, and C are enclosed in microcapsules. The microcapsules can subsequently be blended with colourants (for example, thermally stable dyes) to formulate the thermochromic ink.

In an embodiment, the thermochromic ink is invisible at a starting temperature, and following a temperature rise displays a colour in an irreversible transition. Such functionality may be useful, for example, in the field of one-use disposable razors, to demonstrate that a razor cartridge 20 has been used once (owing to the irreversible nature of the transition).

In an embodiment, the thermochromic ink displays a colour at a starting temperature, and following a temperature rise becomes invisible once the temperature has risen past a first threshold. When the temperature drops, the thermochromic ink may again display colour when the temperature falls past a second threshold (which, in embodiments, may be the same, or different to, the first threshold).

In an embodiment, the thermochromic ink displays a first colour at a starting temperature, and following a temperature rise transitions to display a second colour once the temperature has risen past the first threshold. When the temperature drops, thermochromic ink may again display the first colour when the temperature falls past a second threshold (which, in embodiments, may be the same, or different to, the first threshold).

In an embodiment, the thermochromic ink is invisible at a starting temperature, and following a temperature rise transitions to display a first colour once the temperature has risen past a first threshold. When the temperature drops, the thermochromic ink again becomes invisible when the temperature falls past a second threshold (which, in embodiments, may be the same, or different to, the first threshold).

The function of the thermochromic ink can be explained by compound C.The melting point of compound C defines the temperature at which the thermochromic ink performs a colour transition. In some embodiments, the temperature change leads to reversible colouring. In other embodiments, temperature change leads to permanent discolouration of the ink.

Investigations have indicated that recommended temperatures for a pleasant shaving sensation are contained in the range 20 to 45 degrees Celsius, more specifically 32 to 42 degrees Celsius, and most specifically 35 to 39 degrees Celsius.

In an embodiment, the first thermochromic portion is configured to change colour when the temperature of a portion of the at least one blade support is in the range 20 to 45 degrees Celsius, more specifically 32 to 42 degrees Celsius, and most specifically 35 to 39 degrees Celsius. In this embodiment, when the temperature of the blade support 32 decreases, the starting colour of the thermochromic portion reappears.

In an embodiment, the cartridge 20 comprises a first thermochromic portion configured to perform an irreversible colour change above a first temperature response.

In an embodiment, the cartridge is provided wherein the first optical feature is a coating applied to the at least one blade support comprising the thermochromic portion.

A skilled person will appreciate that many different thermochromic dyes or inks may be used dependent upon design requirements. In embodiments, the leuco dye (compound A) may be selected from the group comprising N-acyl leucomethylene blue and derivative compounds thereof, fluoran dye compounds, diarylphthalide compounds, diphenylmethane compounds, spiropyran compounds, and combinations thereof.

More specifically, the compound A may be one, or mixture, of any of the following: 3-(4-diethylamino-2-ethoxyphenyl)-3-(1-ethyl-2-methylindol-3-yl)-4-azaphthalide (Blue 63, CAS number: 69898-40-4), 2'-(dibenzylamino)-6'-(diethylamino)fluoran (CAS number: 34372-72-0), N,N-dimethyl-4-[2-[2-(octyloxy)phenyl]-6-phenyl-4-pyridinyl] benzenamine (Yellow CK37, CAS number: 144190-25-0), 7-(4-diethylamino-2-hexyloxyphenyl)-7-(1-ethyl-2-methyl-1H-indol-3-yl)-7H-furo[3,4-b]pyridin-5-one (Blue 203, CAS number: 98660-18-5), 2-(2,4-dimethylphenylamino)-3-methyl-6-diethylaminofluoran (Black 15, CAS number: 36431-22-8), 3,3-bis-(1-butyl-2-methyl-indol-3-yl)-3H-isobenzofuran-1-one (Red 40, CAS number: 50292-91-6). Other compounds usable as compound A may also be applied.

Compound B (the colour developer) may be selected from the group comprising of bisphenols, alkoxy-p-hydroxybenzoates, 3,4,5-trihydroxybenzoic acid and the alkyl esters thereof (also known as gallic acid esters) such as dodecyl gallate, urea, diphenyl urea and related compounds such as Pergafast 201, 1,2,3-triazoles, 4-hydroxycoumarin, and mixtures thereof.

More specifically, the compound B may be any of the following: 2,2-bis(4-hydroxy-3-methylphenyl)propane (bisphenol C, CAS number: 79-97-0), 4-hexyl-1,3-dihydroxybenzene (4-hexylresorcinol, CAS number: 136-77-6), 4,4'-cyclohexylidenebisphenol (BPZ, CAS number: 843-55-0), 4,4'-(hexafluoroisopropylidene)diphenol (bisphenol AF, CAS number: 1478-61-1), 4,4'-(1-phenylethylidene)bisphenol (CAS number: 1571-75-1), 2,2'-dihydroxybiphenyl (CAS number: 1806-29-7), 4,4'-(1,4-phenylenediisopropylidene)bisphenol (CAS number: 2167-51-3), 1,1-bis(4-hydroxy-3-methylphenyl)cyclohexane (CAS number: 2362-14-3), 9,9-bis(4-hydroxyphenyl)fluorene (CAS number: 3236-71-3), 4,4'-(1,3-phenylenediisopropylidene)bisphenol (CAS number: 13595-25-0), 1,1,1-tris(4-hydroxyphenyl) ethane (CAS number: 27955-94-8), 4,4'-(2-ethylhexylidene) diphenol (CAS number: 74462-02-5), α,α,α'-tris(4-hydroxyphenyl)-1-ethyl-4-isopropylbenzene (CAS number: 110726-28-8), and mixtures thereof.

Compound C is selected to change colour in temperature ranges listed above. Thus, compound C may be selected from a list of compounds that exhibit melting points between 25-degrees Celsius.

Compound C may be selected from the following families of compounds. For example, compound C may be selected from mono- and poly-alcohols family comprising 1-dodecanol, 2-tridecanol, 1-tetradecanol, 1-pentadecanol, 1-hexadecanol, 2-(4-methoxyphenyl)ethanol, 4-isopropylbenzyl alcohol, 1,2-octanediol, 1,9-nonanediol, 2,2-di-n-butyl-1,3-propanediol. For example, compound C may be selected from alkyl and aryl esters family comprising of ethyl palmitate, 2-hydroxythethyl salicylate, dimethyl sebacate, 2-Phenylethyl Phenylacetate, triethyl methane tricarboxylate, dibenzyl carbonate, adipic acid monoethyl ester, dimethyl 1,10-decanedicarboxylate, methyl palmitate, methyl p-toluate, ethyl 2-furoate, ethyl stearate, benzyl cinnamate, methyl 3,4-dimethylbenzoate, dimethyl itaconate, methyl stearate, methyl 3,5-dimethoxybenzoate, phenyl salicylate, ethyl 4-(benzyloxy)benzoate, ethyl 3,4-dimethoxybenzoate, ethyl vanillate, dibenzyl succinate, 1-naphthyl acetate, diethyl terephthalate, cholesteryl oleate, methyl 2-benzyloxybenzoate, methyl eicosanoate, methyl 2-hydroxy-4-methoxybenzoate, 4-Pentylphenyl 4-methoxybenzoate, octadecyl 3,3-diphenylpropanoate, stearyl benzoate. For example, compound C may be selected from alkyl and aryl ketones family comprising of 4'-methoxypropiophenone, 2-tridecanone, 7-pentadecanone, 5-hexadecanone, 7-hexadecanone, 2-pentadecanone, 4-heptadecanone, 3,4-dimethylbenzophenone, dodecanophenone. For example, compound C may be selected from linear and branched alkanes family comprising N-heptadecane, N-octadecane, N-nonadecane, N-eicosane, N-heneicosane, N-docosane. For example, compound C may be selected from alkyl and aromatic carboxylic acids family comprising undecanoic acid, 8-phenyloctanoic acid, erucic acid, decanoic acid, dodecanoic acid.

Specifically, the compound C may be selected from the group comprising ethyl palmitate, dimethyl sebacate, methyl palmitate, methyl p-toluate, ethyl stearate, methyl 3,4-dimethylbenzoate, dimethyl itaconate, methyl stearate, methyl eicosanoate, 2-tridecanol, 1-dodecanol, 4-isopropylbenzyl alcohol, 2-(4-methoxyphenyl)ethanol, 1,2-octanediol, 1-tetradecanol, 2,2-di-n-butyl-1,3-propanediol, 1-pentadecanol, undecanoic acid, erucic acid, decanoic acid, dodecanoic acid, N-octadecane, N-nonadecane, N-eicosane, N-heneicosane, N-docosane, 2-tridecanone, 7-pentadecanone, 5-hexadecanone, 7-hexadecanone, 2-pentadecanone, 4-heptadecanone, 3,4-dimethylbenzophenone, octadecyl 3,3-diphenylpropanoate, 2-Phenylethyl phenylacetate. More specifically, the compound C is selected from the group comprising methyl palmitate, 1,2-octanediol, decanoic acid, n-octadecane, 7-pentadecanone, dimethyl sebacate, 1-dodecanol, 4-isopropylbenzyl alcohol, n-octadecane, ethyl stearate, octadecyl 3,3-diphenylpropanoate, stearyl benzoate, dodecanophenone.

For example, compound C may be selected from the group of methyl palmitate, 1,2-octanediol, decanoic acid, n-octadecane, 7-pentadecanone that change colour between 28 to 34 degrees Celsius.

For example, compound C may be selected from the group of dimethyl sebacate, 1-dodecanol, 4-isopropylbenzyl alcohol, n-octadecane that change colour between 25-30 degrees Celsius; or specifically between 25-28 degrees Celsius.

For example, compound C may be ethyl stearate that changes colour at 34 degrees Celsius.

For example, compound C may be methyl palmitate that changes colour between 31-35 degrees Celsius.

For example, compound C may be octadecyl 3,3-diphenylpropanoate that changes colour at 32 degrees Celsius.

For example, compound C may be methyl stearate that changes colour at 40 degrees Celsius.

For example, compound C may be stearyl benzoate that changes colour between 42-46 degrees Celsius.

For example, compound C may be dodecanophenone that changes colour between 44-46 degrees Celsius.

More specifically, compound C may be selected from the group of n-eicosane, 5-hexadecanone, 7-hexadecanone, 2,4-dimethylbenzyl alcohol, 1-tetradecanol, methyl 3,4-dimethylbenzoate, dimethyl itaconate, that change colour between 36-38 degrees Celsius.

A skilled person will appreciate that the embodiments above are not limiting, and that other forms of thermochromic ink may be used to provide the visual temperature feedback of the first optical feature on the blade support discussed herein.

In some embodiments, the razor cartridge may comprise a plurality of thermochromic inks. A first thermochromic ink comprises a first reaction medium as compound C. A second thermochromic ink comprises a second reaction medium as compound C that is different from the reaction medium included in the first thermochromic ink. For example, the second thermochromic ink contains reaction medium having a higher or a lower melting point than the reaction medium in the first thermochromic ink.

In some embodiments, the first reaction medium may be selected from the group comprising ethyl palmitate, dimethyl sebacate, methyl palmitate, methyl p-toluate, ethyl stearate, methyl 3,4-dimethylbenzoate, dimethyl itaconate, methyl stearate, methyl eicosanoate, 2-tridecanol, 1-dodecanol, 4-isopropylbenzyl alcohol, 2-(4-methoxyphenyl) ethanol, 1,2-octanediol, 1-tetradecanol, 2,2-di-n-butyl-1,3-propanediol, 1-pentadecanol, undecanoic acid, erucic acid, decanoic acid, dodecanoic acid, N-octadecane, N-nonadecane, N-eicosane, N-heneicosane, N-docosane, 2-tridecanone, 7-pentadec anone, 5-hexadec anone, 7-hexadecanone, 2-pentadecanone, 4-heptadecanone, 3,4-dimethylbenzophenone, octadecyl 3,3-diphenylpropanoate, 2-Phenylethyl phenylacetate. Specifically, the first reaction medium may be selected from the group comprising methyl palmitate, 1,2-octanediol, decanoic acid, n-octadecane, 7-pentadecanone, dimethyl sebacate, 1-dodecanol, 4-isopropylbenzyl alcohol, n-octadecane, ethyl stearate, octadecyl 3,3-diphenylpropanoate, stearyl benzoate, dodecanophenone.

In some embodiments, the thermochromic portion may comprise a mixture of different thermochromic inks having a plurality of temperature responses.

In some embodiments, reaction medium as compound C that melts at temperature ranges higher than the optimum shaving temperature includes 1,2-octanediol, ethyl stearate which changes colour at temperatures above 34 degrees Celsius.

Indicative embodiments of reaction medium as compound C that melts at temperatures lower than the optimum shaving temperature include dimethyl sebacate, 1-dodecanol, 4-isopropylbenzyl alcohol, n-octadecane (colour change between 25 to 30 degrees Celsius) and dimethyl sebacate, 1-dodecanol, 4-isopropylbenzyl alcohol, n-octadecane (colour change between 25 to 28 degrees Celsius).

In an embodiment, the first thermochromic ink changes colour between 30 to 34 degrees Celsius, enabling a user to visually perceive a different colour than the initial colour of the blade support. As the temperature of the water increases, or might still be cold, the user can view a second signal that the temperature is too high or low. This second visual signal is given by a different colour change compared to the first colour change, achieved by u sing a different thermochromic ink comprising a reaction medium as compound C that melts at a higher or a lower temperature than the range 30 to 34 degrees Celsius, in combination with a different colourant.

In an embodiment, the colour change occurs within several seconds, specifically within 0.01 second to 10 seconds, more specifically within 0.1 second to 5 seconds, upon exposure of an aqueous solution at the optimum shaving temperature.

For example, the first thermochromic portion 74 on the blade support in the razor cartridge 20 can show a colour change within 2 seconds, or within 1 second, or within 0.5 seconds upon exposure at the optimum shaving temperature or above.

In an embodiment, the first optical feature is a first thermochromic portion configured to change colour based on temperature of the at least one blade support. Therefore, the first thermochromic portion 74 extends along the entire top side 65 of one blade support 32 of the razor cartridge 20. In an embodiment, the first thermochromic portion 74 may be provided as a portion extending halfway, one third, or one quarter along the top side 65 of one blade support 32.

Figure 6:
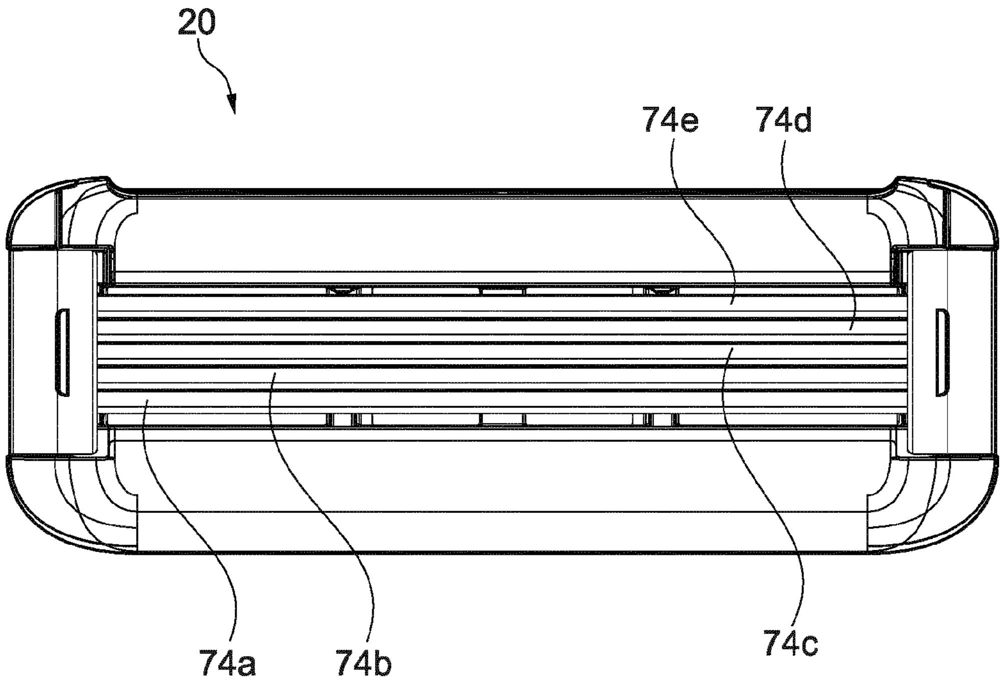
FIG. 6 shows a schematic front view of a razor cartridge showing an exemplary layout of thermochromic portions on cutting members according to an embodiment.

FIG. 6 shows a schematic front view of a razor cartridge showing an exemplary layout of thermochromic portions 74*a*-74*e* on cutting members according to an embodiment. The razor cartridge 20 shown in FIG. 6 comprises five blades. However, the skilled person will appreciate that the present technique is optionally applicable to razor cartridges having one, two, three, four, five, or more blades and the corresponding blade supports 32.

The thermochromic portions 74*a-e* are provided on the top sides 65 of the blade supports 32 in the razor cartridge illustrated in FIG. 6. The extra space on the top sides 65 of the blade supports provided by the respective blades being attached to respective inner surfaces of the blade supports provides vacant space at the front view of the razor cartridge to enable a legible set of thermochromic portions 74*a-e* to be displayed to a user.

FIG. 7 shows schematic views of alternative layout approaches for thermochromic portions on cutting members according to an embodiment.

Figure 7A:
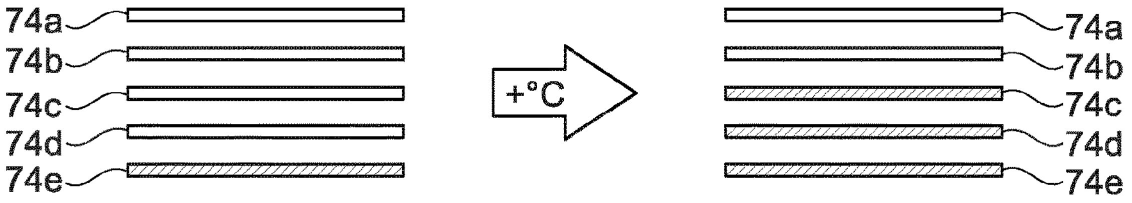
FIG. 7*a*-7*d* shows schematic views of alternative layout approaches for thermochromic portions on cutting members according to an embodiment.

FIG. 7*a*) shows a schematic view of a plurality of thermochromic portions 74*a*-74*e* each applied to the top side 65 of respective blade supports (not shown). In this case, the thermochromic portions 74*a*-74*e* each have escalating transition temperatures. The left-hand side of FIG. 7*a*) shows the arrangement of thermochromic portions 74*a*-74*e* at a low shaving temperature. The right-hand side of FIG. 7*a*) shows the thermochromic portions at an acceptable shaving temperature. The colouring of the arrangement of thermochromic portions 74*a*-74*e* therefore behaves in the manner of a bar graph in a transverse direction of the razor cartridge 20. In an embodiment, each thermochromic portion 74*a*-74*e* displays the same colour. In an embodiment, each thermochromic portion 74*a*-74*e* displays a progressively changing colour (for example, from blue to red to indicate a change from cold to hot).

Figure 7B:
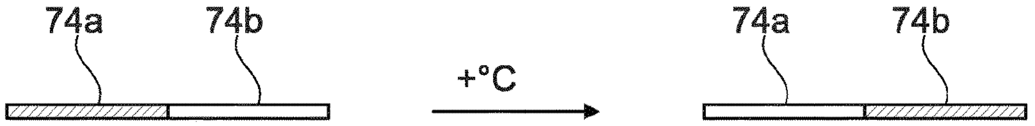

FIG. 7*b*) shows a schematic view of a top side 65 of a single blade support 32 comprising a first thermochromic portion 74*a* and a second thermochromic portion 74*b*. As the temperature increases, the pigmentation of the first and second thermochromic portions "toggles" from left to right, to indicate that the razor is at the correct temperature.

Figure 7C:
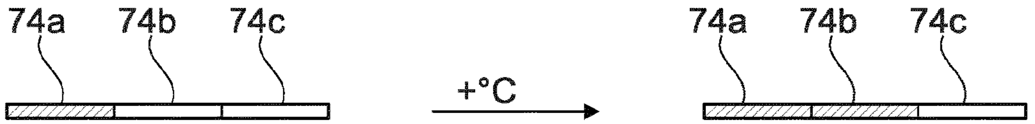

FIG. 7*c*) shows a longitudinal version of the arrangement of FIG. 7*a*), in which three thermochromic portions 74*a*-74*c* function as a longitudinal bar graph as the temperature increases. Of course, this assumes uniform heating of the blade support 32. Of course, if non-uniform heating of the blade support occurs (for example, when holding the razor too still when rinsing under a hot tap), such a longitudinal arrangement of a plurality of thermochromic portions can assist a user in equalising the temperature of the entire set of blades along the entire longitudinal dimension.

According to an embodiment, the first thermochromic portion extends longitudinally along the at least one blade support, and wherein the first thermochromic portion is divided longitudinally into at least a first and a second sub-portion, wherein the first sub-portion is configured to display a different colour from the second sub-portion based on the temperature of the at least one blade support. A sub portion may be considered to be one of the thermochromic portions 74*a*, 74*b*, and/or 74*c* as illustrated in FIG. 7*b*) or 7*c*). In other words, a sub-portion of a thermochromic portion is a segment divided from the thermochromic portion.

Figure 7D:
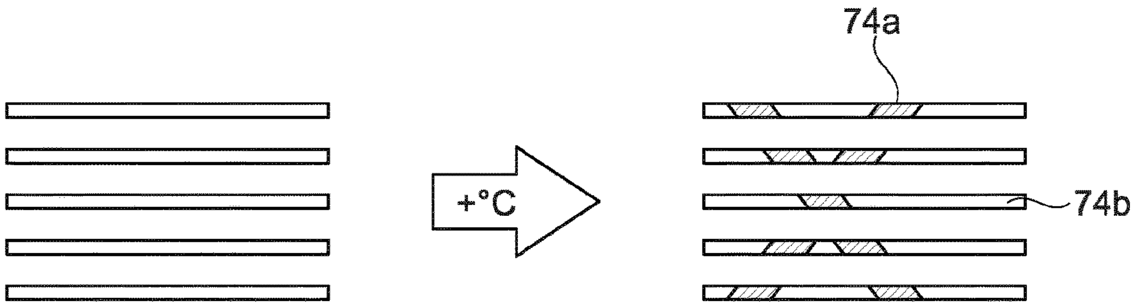

FIG. 7*d*) illustrates a first thermochromic portion 74*a* that is distributed across five sets of top sides 65 of blade supports in the form of a cross logo (the thermochromic portions can be provided in the form of any logo or graphic). Therefore, a warning sign can be displayed when the razor cartridge 20 reaches an unsafe temperature. Alternatively, a manufacturer logo made it may be displayed when the razor cartridge 20 reaches a safe temperature.

Many other variations and arrangements of thermochromic portions 74 upon blade supports of razor cartridge may be considered by a skilled person, and the foregoing discussion is intended to illustrate embodiments.

In an embodiment, the first optical feature includes a first layer and a second layer disposed on the first layer, wherein the first layer includes a first colour, the second layer includes a second colour, and the second layer is configured to be gradually removed during use of the razor. Therefore, the second layer is a material or compound that can be gradually eroded in use. For example, the second layer may be a material such as a wax that gradually melts and is removed in a stream of warm rinsing water, to thus reveal the colour of the first layer. Alternatively or in combination, the second layer may be gradually removed through the action of friction when shaving.

Figure 8:
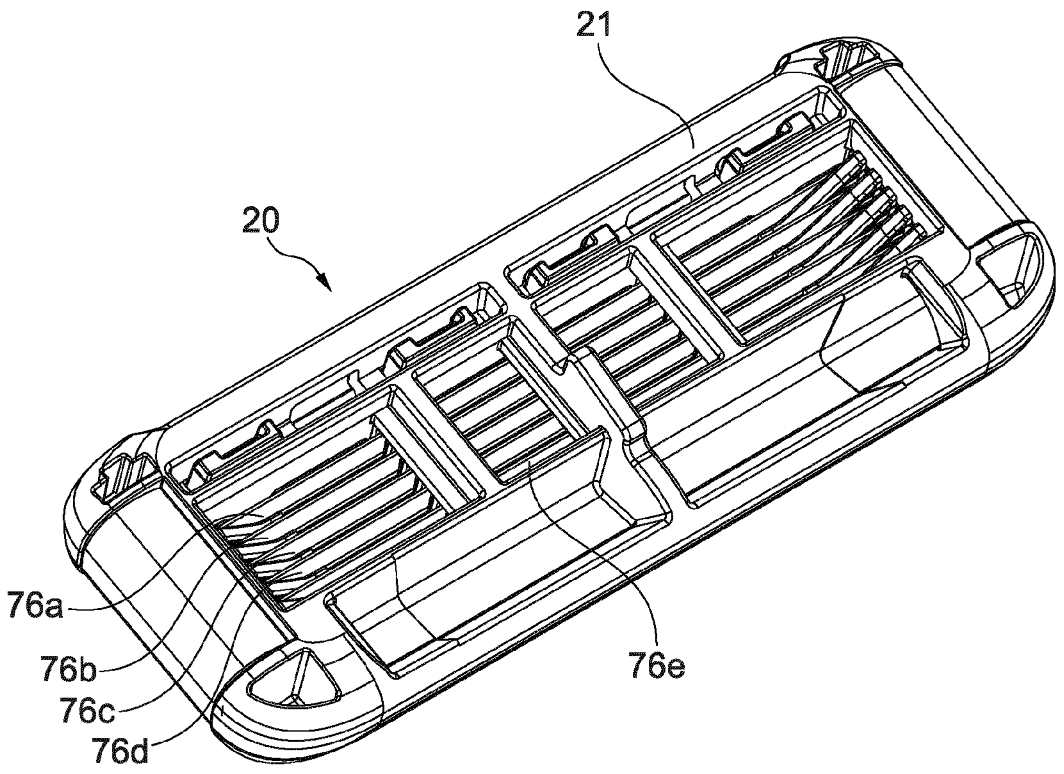
FIG. 8 shows a perspective rear view of a razor cartridge showing an exemplary layout of thermochromic portions on the rear of cutting members according to an embodiment.
Figure 9:
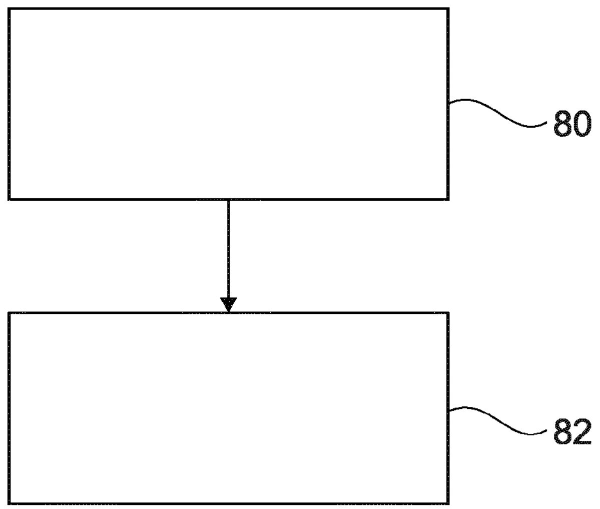
FIG. 9 illustrates a method of manufacturing a razor cartridge according to an embodiment

FIG. 8 shows a perspective rear view of a razor cartridge showing an exemplary layout of thermochromic portions on the rear of cutting members according to an embodiment. As discussed in the section above concerning FIG. 4, it is not essential that the thermochromic portion is distributed entirely on the top side 65 of the blade support 32. For example, a second thermochromic portion 76 and/or a third thermochromic portion 78 may be provided on one or more sides of the blade support 32.

As seen in the perspective view of FIG. 8, a razor cartridge with an "open architecture" frame 21 has good visibility to the rear of the blade supports. Accordingly, providing second and/or third thermochromic portions on the sides of the support member 32 can improve the amount of information available to a user of a razor cartridge.

According to an embodiment, the first thermochromic portion is configured to display a colour gradient along a longitudinal direction of the at least one blade support, and the colour gradient changes in a longitudinal direction based on the temperature of the at least one blade support.

Accordingly, the mixture of dyes and reaction mediums in the ink applied to the thermochromic portion changes longitudinally as the ink is applied to, for example, the top surface 65 of the blade support. The effect is that, when the blade support is held at a constant temperature, a colour gradient that changes between and first and a second colour that changes in the longitudinal direction of the blade support is displayed. As the temperature of the blade support increases, the colour gradient may travel along the blade support in a longitudinal direction.

According to an embodiment, the first optical feature is not provided on the blade.

According to an embodiment, the first optical feature is provided on a first blade support of the plurality of blade supports, and the second optical feature is provided on a second blade support of the plurality of blade supports.

According to an embodiment, the first and second optical features are provided on the same blade support of the plurality of blade supports.

According to an embodiment, the same blade support comprises an erodible overlapping portion between the first and second optical features.

According to an aspect, there is provided method of manufacturing a cartridge for a razor according to the disclosure comprising:

- obtaining 80 a plurality of blade supports 32, wherein at least one blade support 32 further comprises a blade 33 attached to an inner surface 66 of the blade support that faces away from the shaving surface, wherein the at least one blade support 32 comprises a first optical feature disposed on a portion of an outer surface 68 of the at least one blade support that faces towards a shaving surface, and
- providing 82 the first optical feature on the at least one blade support comprising a first thermochromic portion 74 configured to change colour based on the temperature of the at least one blade support 32 according to a first temperature response of the first thermochromic portion.

In embodiments, the thermochromic ink can be applied as a coating on the blade support according to any of the standard methods used to apply paints or coatings such as application by brush, roller, using a conventional air spray or an airless spray. In some embodiments, curing may also be applied as additional step, after the application of the thermochromic ink as coating, if the composition of the thermochromic ink needs to be cured for being solidified.

In embodiments, the deposition of the coating occurs after the attachment of the blade onto the support. In some embodiments, the thermochromic ink formed as coating may be applied before the attachment of the blade onto the blade support. The thermochromic ink is applied as coating on the blade support as it is in flat-wire form (i.e. when it is a blank). Subsequently, the blank blade support bearing the thermochromic ink undergoes further production steps including stamping, bending, welding and cropping.

In the preceding specification, numerous specific details are set forth in order to provide a thorough understanding. It will be apparent, however, to one having ordinary skill in the art that the specific detail need not be employed to practice the present disclosure. In other instances, well-known materials or methods have not been described in detail in order to avoid obscuring the present disclosure.

Reference throughout the preceding specification to "one embodiment", "an embodiment", "one example" or "an example", "one aspect" or "an aspect" means that a particular feature, structure or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics may be combined in any suitable combinations and/or sub-combinations in one or more embodiments or examples.

| REFERENCE NUMERALS | |
|---|---|
| S | Shaving direction |
| SH | Shaving plane |
| L | Longitudinal direction |
| IBS | inter blade span |
| RO | inner radius of curvature |
| T1 | Razor blade thickness |
| T2 | Blade support thickness |
| 1 | Shaving razor assembly |
| 2 | Shaver handle |
| 4 | proximal portions |
| 5a, 5b | release mechanism |
| 6 | distal portion |
| 8 | pivotable bearing member |
| 9 | handle grips |
| 16 | first side portion |
| 18 | second side portion |
| 20 | razor cartridge |
| 21 | frame |
| 22 | platform member |
| 23 | guard member |
| 24 | leading longitudinal side |
| 25 | trailing longitudinal side |
| 26 | first retainer |
| 27 | second retainer |
| 28a-d | cutting member |
| 29 | group of cutting members |
| 30a-d | cutting edge |
| 31a-d | blade receiving section |
| 32 | blade support |
| 33a-d | blade |
| 34a-d | holding slots |
| 35 | cross member |
| 36 | blade support guide |
| 38a-d | resilient finger |
| 49 | longitudinal trailing assembly |
| 50 | longitudinal skin care element |

-continued

| REFERENCE NUMERALS | |
|---|---|
| 52 | retractable cover |
| 53 | trimming blade |
| 54 | trimming blade support |
| 60 | lower portion of blade support |
| 62 | radius bend |
| 64 | rounded indent |
| 65 | top side of blade support member |
| 66 | inner surface of blade support |
| 68 | outer surface of blade support |
| 70 | inner face of blade |
| 71 | blade mounting portion |
| 72 | rounded front end of blade support |
| 74 | first thermochromic portion |
| 76 | second thermochromic portion |
| 78 | third thermochromic portion |
| 80 | obtaining a plurality of blade supports . . . |
| 82 | providing the first optical feature . . . |

The invention claimed is:

1. A cartridge for a razor, the cartridge comprising:

a plurality of blade supports, wherein at least one of the blade supports further comprises a blade attached to an inner surface of the at least one of the blade supports that in use faces away from a shaving surface, wherein the at least one of the blade supports comprises a first optical feature disposed on a portion of an outer surface of the at least one of the blade supports that is visible when observed from a perspective of the shaving surface; and wherein the first optical feature is a first thermochromic portion configured to change colour based on a temperature of the at least one of the blade supports according to a first temperature response of the first thermochromic portion.

2. The cartridge according to claim 1, wherein the plurality of blade supports comprises a second blade support, wherein the second blade support comprises a second optical feature disposed on a portion of an outer surface of the second blade support that, in use, faces towards the shaving surface, wherein the second optical feature is a second thermochromic portion configured to change colour based on the temperature of the second blade support according to a second temperature response of the second thermochromic portion.

3. The cartridge according to claim 2, wherein the at least one of the blade supports further comprises a further optical feature disposed on a different portion of the outer surface of the at least one of the blade supports that in use faces towards the shaving surface than the portion of the at least one of the blade supports comprising the first thermochromic portion, wherein the further optical feature is a further thermochromic portion configured to change colour based on the temperature of the at least one of the blade supports according to a further temperature response of the further thermochromic portion.

4. The cartridge according to claim 3, wherein the first temperature response of the first thermochromic portion is different from the second temperature response of the second thermochromic portion and/or different from the further temperature response of the further thermochromic portion.

5. The cartridge according to claim 2, wherein the first thermochromic portion comprises a thermochromic ink compound comprising one or more of: a leuco dye, a developer, and a first reaction medium.

6. The cartridge according to claim 5, wherein the second thermochromic portion comprises a thermochromic ink compound comprising one or more of: a leuco dye, a developer, and a second reaction medium, and wherein the second reaction medium has a melting point that is higher or lower than the melting point of the first reaction medium.

7. The cartridge according to claim 5, wherein the first reaction medium is selected from the group comprising-methyl palmitate, 1,2-octanediol, decanoic acid, n-octadecane, 7-pentadecanone, dimethyl sebacate, 1-dodecanol, 4-isopropylbenzyl alcohol, n-octadecane, ethyl stearate, octadecyl 3,3-diphenylpropanoate, stearyl benzoate, dodecanophenone.

8. The cartridge according to claim 1, wherein the first thermochromic portion is configured to display a first colour when the at least one of the blade supports has a first temperature and to display a second colour when the at least one of the blade supports has a second temperature.

9. The cartridge according to claim 1, wherein the first thermochromic portion is configured to change colour when the temperature of a portion of the at least one of the blade supports is in the range of 20-45 degrees Celsius.

10. The cartridge according to claim 1, wherein the first thermochromic portion extends longitudinally along the at least one of the blade supports, and wherein the first thermochromic portion is divided longitudinally into at least a first sub-portion and a second sub-portion, wherein the first sub-portion is configured to display a different colour from the second sub-portion based on the temperature of the at least one of the blade supports.

11. The cartridge according to claim 1, wherein the first optical feature includes a first layer and a second layer disposed on the first layer, wherein the first layer includes a first colour, the second layer includes a second colour, and the second layer is configured to be gradually removed during use of the cartridge.

12. The cartridge according to claim 1, wherein the at least one of the blade supports includes a first portion, a second portion, and a third portion, wherein the third portion is visible through a rear of a frame of the cartridge, and the first optical feature is provided on one or more of the first portion, the second portion, or the third portion.

13. A method of manufacturing the cartridge for a razor according to claim 1, comprising:

obtaining the plurality of blade supports, wherein at least one of the blade supports further comprises the blade attached to the inner surface of the at least one of the blade supports that faces away from the shaving surface, wherein the at least one of the blade supports comprises the first optical feature disposed on the portion of the outer surface of the at least one of the blade supports that faces towards the shaving surface, and providing the first optical feature on the at least one of the blade supports comprising the first thermochromic portion configured to change colour based on the temperature of the at least one of the blade supports according to the first temperature response of the first thermochromic portion.

14. A shaving razor assembly comprising:

a razor handle;

the cartridge according to claim 1, wherein the cartridge is either releasably attached to the razor handle via a pivotable or non-pivotable connection, integrally formed with the razor handle via a non-pivotable connection, or integrally formed with the razor handle via a pivotable connection.

15. A kit of parts comprising:

a razor cartridge holder comprising a plurality of the cartridges according to claim 1.

16. The cartridge according to claim 1, wherein the first thermochromic portion is configured to change colour when the temperature of a portion of the at least one of the blade supports is in the range of 32-42 degrees Celsius.

17. The cartridge according to claim 1, wherein the first thermochromic portion is configured to change colour when the temperature of a portion of the at least one of the blade supports is in the range of 35-39 degrees Celsius.

* * * * *